United States Patent
Fawcett

(10) Patent No.: US 8,868,963 B2
(45) Date of Patent: *Oct. 21, 2014

(54) DYNAMICALLY CONFIGURABLE PLACEMENT ENGINE

(71) Applicant: International Business Machines Corporation, Armonk, NY (US)

(72) Inventor: Bradley W. Fawcett, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,066

(22) Filed: Dec. 11, 2012

(65) Prior Publication Data

US 2013/0145121 A1    Jun. 6, 2013

Related U.S. Application Data

(63) Continuation of application No. 13/308,800, filed on Dec. 1, 2011.

(51) Int. Cl.
*G06F 11/00* (2006.01)
*G06F 9/50* (2006.01)
*G06F 9/30* (2006.01)

(52) U.S. Cl.
CPC .......... *G06F 9/30007* (2013.01); *G06F 9/5061* (2013.01)
USPC ............................ 714/3; 709/223; 709/224

(58) Field of Classification Search
USPC ............................................................ 714/3
See application file for complete search history.

(56) References Cited

U.S. PATENT DOCUMENTS

| 6,097,886 | A  | 8/2000 | Dave et al. |
| 6,393,473 | B1 | 5/2002 | Chu |
| 7,493,406 | B2 | 2/2009 | Amini et al. |

(Continued)

FOREIGN PATENT DOCUMENTS

| CN | 1744593 A  | 3/2006 |
| EP | 0936547 A2 | 8/1999 |

OTHER PUBLICATIONS

U.S. Appl. No. 13/308,800 entitled "Dynamically Configureable Placement Engine", filed Dec. 1, 20111.

(Continued)

*Primary Examiner* — Kamini Patel
(74) *Attorney, Agent, or Firm* — Patterson & Sheridan LLP

(57) ABSTRACT

A stream application may allocate processing elements to one or more compute nodes (or hosts) to achieve a desired optimization goal. Each optimization mode may define processing element selection criteria and/or host selection criteria. When allocating a processing element to a host, a scheduler may place each processing element individually. Accordingly, the scheduler may use the processing element selection criteria for selecting which processing element in the stream application to allocate next. The scheduler may then determine, based on one or more constraints, which host the processing element can be placed on. If the scheduler determines that multiple hosts are suitable candidates for the processing element, it may use the host selection criteria to pick one of the candidate hosts that further optimize the stream application to meet the desired goal. Examples of different optimization goals that may be achieved using processing element and host selection criteria include optimizing performance, decreasing maintenance and operating costs, increasing solvability, sharing limited computer resources with other applications, and the like.

13 Claims, 10 Drawing Sheets

(56) References Cited

U.S. PATENT DOCUMENTS

| | | | |
|---|---|---|---|
| 7,539,976 | B1 | 5/2009 | Ousterhout et al. |
| 7,613,848 | B2 | 11/2009 | Amini et al. |
| 7,657,855 | B1* | 2/2010 | Manaker et al. ............. 716/113 |
| 7,676,552 | B2* | 3/2010 | Eilam et al. ................... 709/218 |
| 7,676,788 | B1 | 3/2010 | Ousterhout et al. |
| 7,899,861 | B2 | 3/2011 | Feblowitz et al. |
| 8,225,319 | B2* | 7/2012 | Laithwaite et al. ........... 718/102 |
| 2004/0039815 | A1 | 2/2004 | Evans et al. |
| 2005/0177600 | A1* | 8/2005 | Eilam et al. ................. 707/104.1 |
| 2005/0198244 | A1* | 9/2005 | Eilam et al. ................... 709/223 |
| 2007/0021998 | A1* | 1/2007 | Laithwaite et al. ............... 705/9 |
| 2008/0127191 | A1 | 5/2008 | Barsness et al. |
| 2008/0134193 | A1* | 6/2008 | Corley et al. ................. 718/104 |
| 2008/0174598 | A1 | 7/2008 | Risenhoover |
| 2008/0225326 | A1 | 9/2008 | Kephart et al. |
| 2009/0132541 | A1 | 5/2009 | Barsness et al. |
| 2009/0183168 | A1* | 7/2009 | Uchida ......................... 718/104 |
| 2009/0239480 | A1 | 9/2009 | Rofougaran et al. |
| 2009/0241123 | A1 | 9/2009 | Bansal et al. |
| 2009/0300326 | A1 | 12/2009 | Sweeney |
| 2009/0300615 | A1 | 12/2009 | Andrade et al. |
| 2009/0300623 | A1 | 12/2009 | Bansal et al. |
| 2009/0306615 | A1 | 12/2009 | Olsson |
| 2009/0313614 | A1 | 12/2009 | Andrade et al. |
| 2010/0292980 | A1 | 11/2010 | Andrade et al. |
| 2010/0325621 | A1 | 12/2010 | Andrade et al. |
| 2011/0055519 | A1 | 3/2011 | Schenfeld et al. |
| 2011/0246549 | A1 | 10/2011 | Katzenberger et al. |
| 2012/0096468 | A1 | 4/2012 | Chakravorty et al. |
| 2012/0110550 | A1 | 5/2012 | Ghosh et al. |
| 2013/0144931 | A1 | 6/2013 | Fawcett |
| 2013/0145034 | A1 | 6/2013 | Fawcett |

OTHER PUBLICATIONS

Madden, Samuel et al., Fjording the Stream: An Architecture for Queries over Streaming Sensor Data, Proceedings of the 18th International Conference on Data Engineering, 2002, p. 555, IEEE, Piscataway, New Jersey, United States.

Liew, C.S. et al., Towards Optimising Distributed Data Streaming Graphs using Parallel Streams, Proceedings of the 19th ACM International Symposium on High Performance Distributed Computing, 2010, pp. 725-736, ACM, New York, New York, United States.

Lakshmanan, Geetika T. et al., Biologically-Inspired Distributed Middleware Management for Stream Processing Systems, Proceedings of the 9th ACM/IFIP/USENIX International Conference on Middleware, 2008, pp. 223-242, Springer-Verlag New York, Inc., New York, New York, United States.

IBM, IBM InfoSphere Streams V2.0 extends streaming analytics, simplifies development of streaming applications, and improves performance, Apr. 12, 2011, pp. 1-17, IBM Corporation, Armonk, New York, United States.

Bouillet, Eric et al., Scalable, Real-time Map-Matching using IBM's System S, Proceedings of the 2010 Eleventh International Conference on Mobile Data Management, 2010, pp. 249-257, IEEE Computer Society, Washington, DC, United States.

Lakshmanan, G. T. et al, Placement Strategies for Internet-Scale Data Stream Systems, Nov. 11, 2008, p. 50, vol. 12, Issue 6, IEEE Computer Society, Washington, DC, United States.

Le, Jia-Jin et al., DDSQP: A WSRF-Based Distributed Data Stream Query System, Lecture Notes in Computer Science, 2005, pp. 833-844, vol. 3758, Springer, New York, New York, United States.

Ahmad, Yanif et al, Network Awareness in Internet-Scale Stream Processing, IEEE Data Engineering Bulletin, Mar. 2005, pp. 63-69, vol. 28, No. 1, IEEE, Piscataway, New Jersey, United States.

Gedik, Bugra, High-performance Event Stream Processing Infrastructures and Applications with System S, IBM Research, 2009, IBM Corporation, Armonk, New York, United States.

Zhang, Xiaolan J. et al, Workload Characterization for Operator-Based Distributed Stream Processing Applications, Proceedings of the Fourth ACM International Conference on Distributed Event-Based Systems, 2010, pp. 235-247, ACM, New York, New York, United States.

Amini, Lisa et al., Adaptive Control of Extreme-scale Stream Processing Systems [Abstract], Proceedings of the 26th IEEE International Conference on Distributed Computing Systems, 2006, IEEE Computer Society, Washington, DC, United States, <http://dl.acm.org/citation.cfm?id=1154083>.

Guha, Radha et al., An efficient placement algorithm for run-time reconfigurable embedded system, Proceedings of the 19th IASTED International Conference on Parallel and Distributed Computing and Systems, 2007, ACTA Press, Anaheim, California, United States, <http://portal.acm.org/citation.cfm?id=1647581>.

U.S. Patent Application entitled "Agile Hostpool Allocator", filed Dec. 1, 2011.

U.S. Patent Application entitled "Candidate Set Solver With User Advice", filed Dec. 1, 2011.

Bugra Gedik et al., "SPADE: The System S Declarative Stream Processing Engine", ACM, SIGMOD '08, Jun. 9-12, 2008, Vancouver, BC, Canada, sections 2, 4.1, 5.3, pp. 1123-1134.

Kun-Lung Wu et al., "Challenges and Experience in Prototyping a Multi-Modal Stream Analytic and Monitoring Application on System S", VLDB '07, Sep. 23-28, 2007, Vienna, Austria, pp. 1185-1196.

International Search Report and Written Opinion of the ISA dated Apr. 25, 2013—International Application No. PCT/IB2012/056823.

International Search Report and Written Opinion of the ISA dated Apr. 25, 2013—International Application No. PCT/IB2012/056818.

Wolf, Joel et al, SODA: An Optimizing Scheduler for Large-Scale Stream-Based Distributed Computer Systems, Proceedings of the 9th ACM/IFIP/USENIX International Conference on Middleware, pp. 306-325, Springer-Verlag, New York, United States.

* cited by examiner

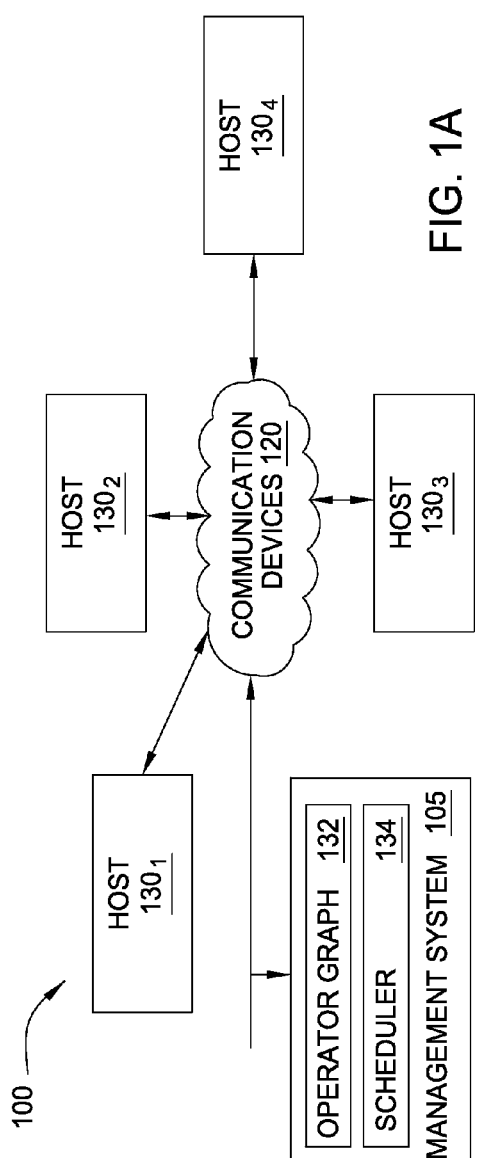
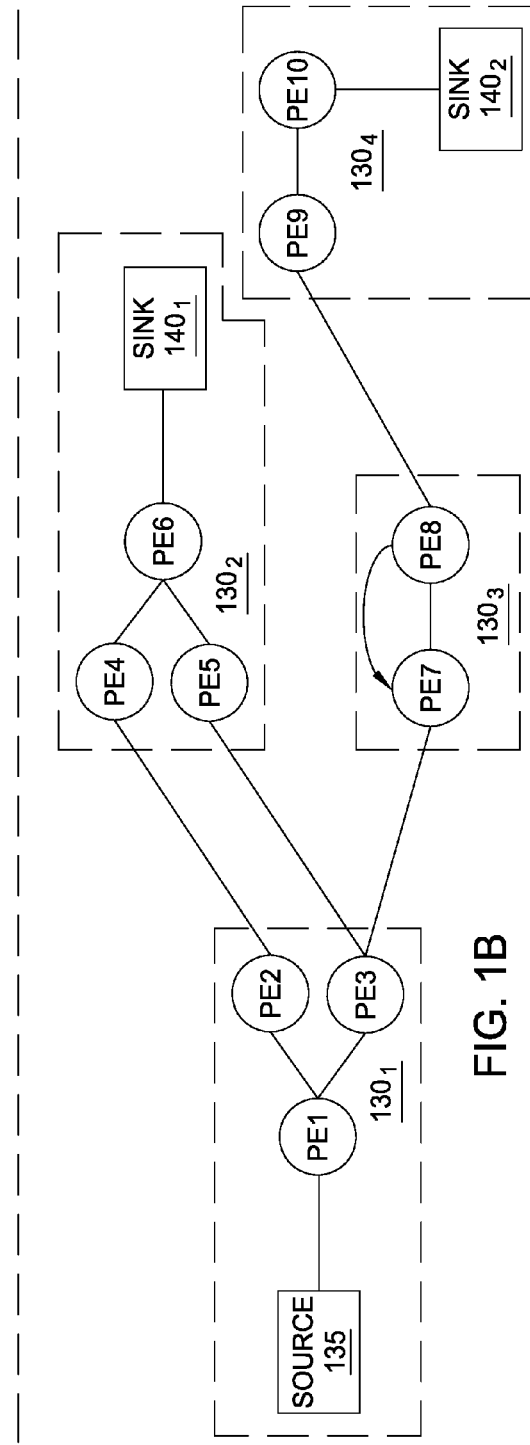
FIG. 1A
FIG. 1B

420

| ALLOCATION WITHOUT CONSIDERING CONSTRAINTS ||
| HOSTPOOL | PINNED HOSTS |
| --- | --- |
| HOSTPOOL 1 | HOSTS A and B |
| HOSTPOOL 2 | HOSTS C, D, and E |
| HOSTPOOL 3 | HOST D |

425

| PE | ASSOCIATED HOSTPOOL | CONSTRAINT |
| --- | --- | --- |
| PE1 | HOSTPOOL 1 | CO-LOCATE GROUP1 |
| PE2 | HOSTPOOL 2 | CO-LOCATE GROUP1; EX-LOCATE GROUP 1 |
| PE3 | HOSTPOOL 3 | EX-LOCATE GROUP1 |
| PE4 | HOSTPOOL 2 | EX-LOCATE GROUP1 |
| PE5 | HOSTPOOL 2 | EX-LOCATE GROUP1 |

430

| ALLOCATION WITH CONSTRAINTS |||
| HOSTPOOL | PINNED HOSTS | PE ALLOCATION |
| --- | --- | --- |
| HOSTPOOL 1 | HOSTS A and C | PE1→HOST C; |
| HOSTPOOL 2 | HOSTS C, E, and F | PE2→HOST C; PE4→HOST E; PE5→HOST F |
| HOSTPOOL 3 | HOST D | PE3→HOST D |

FIG. 4B

DYNAMICALLY CONFIGURABLE PLACEMENT ENGINE

CROSS-REFERENCED TO RELATED APPLICATIONS

This application is a continuation of co-pending U.S. patent application Ser. No. 13/308,800, filed Dec. 1, 2011. The aforementioned related patent application is herein incorporated by reference in its entirety.

BACKGROUND

1. Field of the Invention

Embodiments of the present invention generally relate to stream applications. Specifically, the invention relates to using selection criteria to assign processing elements to a compute node based on optimization goals.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the present invention generally relate to stream applications. Specifically, the invention relates to using selection criteria to assign processing elements to a compute node based on a plurality of optimization goals.

Embodiments of the present invention include a computer-implemented method, system, and computer readable storage medium for establishing a stream application. The method, system, and storage medium include selecting a processing element from a plurality of processing elements in the stream application based on at least one processing element selection criteria. The method, system, and storage medium also include determining a plurality of candidate compute nodes from a plurality of compute nodes to which the processing element can be allocated based on one or more constraints. The method, system, and storage medium include selecting, based on at least one compute node selection criteria, the compute node from the candidate compute nodes wherein at least one of the processing element selection criteria and the computer node selection criteria is determined by a current optimization mode for the stream application that is selected from a plurality of optimization modes. The method, system, and storage medium include allocating the processing element to the compute node.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B illustrate a computing infrastructure configured to execute a stream application, according to one embodiment of the invention.

FIGS. 4A-4B illustrate tables detailing the assignment of hosts to hostpools, according to embodiments of the invention.

DETAILED DESCRIPTION

Figure 2:
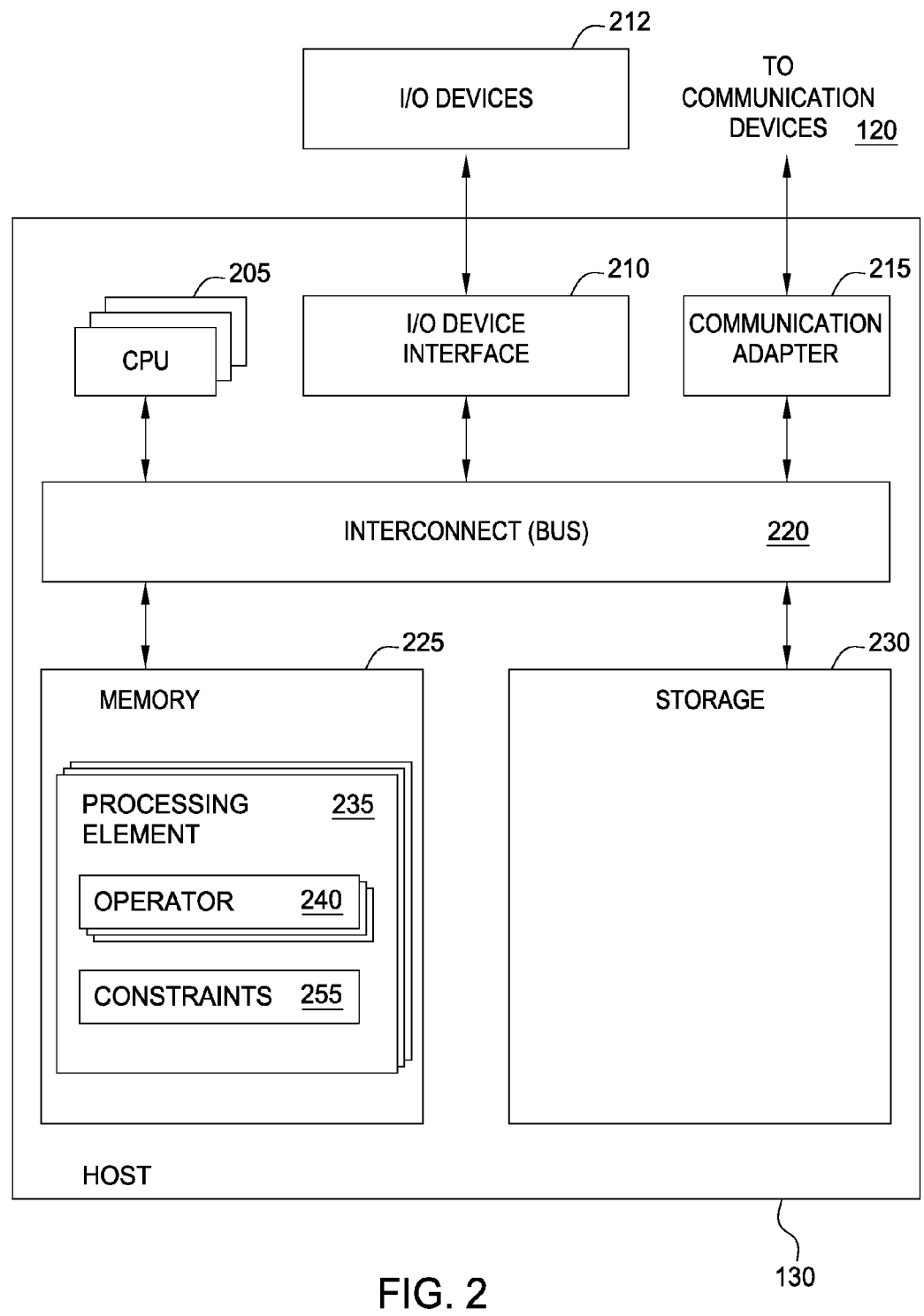
FIG. 2 is a more detailed view of the hosts of FIGS. 1A-1B, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, operators are connected to one another such that data flows from one operator to the next forming a logical dataflow graph. Scalability is reached by distributing an application across compute nodes by creating many small executable pieces of code—i.e., processing elements (PE)—as well as load balancing among them. One or more operators in a stream application can be fused together to form a PE. Doing so allows the fused operators to share a common process space (i.e., shared memory), resulting in much faster communication between operators than is available using inter-nodal communication protocols (e.g., using a TCP/IP). Further, groups of processing elements—i.e., jobs—can be inserted or removed dynamically from one or more applications performing streaming data analysis.

One advantage of stream applications is that they allow the user to granularly control the process flow of data through the application. In other words, the user may designate specific operators for each PE that perform various operations on the incoming data, and may dynamically alter the stream application by modifying the operators and the order in which they are performed.

Establishing a stream application requires allocating each PE to a host (i.e., compute node). But in stream applications with hundreds or thousands of processing elements, the choice of which processing elements to allocate first may determine if all the PEs in the stream application are successfully allocated. Accordingly, the stream application may use PE selection criteria to select which PE from among the unallocated PEs to allocate next. For example, the stream application may first allocate the PEs that have location constraints that require, for example, the PE to be the only PE allocated to a host. If these PEs are allocated first, the probability that all of the PEs will be allocated to a host may be increased.

The constraints, which dictate where a PE can be allocated, may be associated with the different elements of a stream application—e.g., PEs, operators, hostpools, jobs, and hosts. This allocation also determines the runtime characteristics of the stream application—e.g., performance, availability, etc. For example constraints may control whether the PE can be placed on a host that is also executing other PEs or whether two PEs must be placed on the same host. The first constraint may increase the availability of the stream application while the second may increase its performance.

However, multiple hosts may satisfy the constraints. For example, after the constraints are evaluated, Host A and B may both satisfy the constraints associated with allocating PE 1. In this situation, the stream application may select one of the otherwise suitable hosts based on host selection criteria. The criteria may be the host that has the least number of processes currently executing on it or the host with the most available processing power.

Either the PE selection criteria or the host selection criteria (or both) may be associated with a particular optimization mode. The optimization mode may define a desired result of the stream application and may represent varying degrees of solvability, cost, performance, cluster configuration, and the like. To continue the example above, although both Host A and B meet all the constraints, selecting which one to allocate to PE 1 may have consequences when allocating later PEs. Assume, for example, that PE 1 is allocated to Host A but the stream application later determines that a constraint associated with PE 2 requires it to be allocated to Host A without Host A executing any other PEs. The stream application would not meet all the criteria and the allocation of the PEs to the hosts may fail. However, if the optimization mode of the stream application was changed to favor solvability (i.e., the probability that the stream application will allocate each of the PEs to a host) then the PE selection criteria associated with that optimization mode may choose to allocate PEs with location constraints (i.e., PE 2) before PEs that do not (i.e., PE 1).

Additionally, the stream application may change optimization modes if all the PEs cannot be allocated to the hosts—e.g., the constraints are not satisfied or a threshold time limit is exceeded. In this situation, the stream application may switch to a different optimization mode which may change the PE or host selection criteria. For example, the stream application may change from optimization mode that considers only performance criteria to a mode that includes criteria that balance between performance and solvability.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the compute nodes or hosts used to create a stream application may be virtual or physical machines maintained by a cloud service provider. Doing so allows a user to send data to the stream application from any computing system attached to a network connected to the cloud (e.g., the Internet).

FIGS. 1A-1B illustrate a computing infrastructure configured to execute a stream application, according to one embodiment of the invention. As shown, the computing infrastructure 100 includes a management system 105 and a plurality of hosts $130_{1-4}$—i.e., compute nodes—which are communicatively coupled to each other using one or more communication devices 120. The communication devices 120 may be a server, network, or database and may use a particular communication protocol to transfer data between the hosts $130_{1-4}$. Although not shown, the hosts $130_{1-4}$ may have internal communication devices for transferring data between PEs located on the same host 130. Also, the management system 105 includes an operator graph 132 and a scheduler 134 (i.e., a stream manager). As described in greater detail below, the operator graph 132 represents a stream application beginning from one or more source operators through to one or more sink operators. This flow from source to sink is also generally referred to herein as an execution path. Typically, processing elements receive an N-tuple of data attributes from the stream as well as emit an N-tuple of data attributes into the stream (except for a sink operator where the stream terminates or a source operator where the stream begins). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The scheduler 134 may be configured to monitor a stream application running on the hosts $130_{1-4}$, as well as to change the deployment of the operator graph 132. The scheduler 134 may, for example, move PEs from one host 130 to another to manage the processing loads of the hosts $130_{1-4}$ in the computing infrastructure 100.

FIG. 1B illustrates an example operator graph 132 that includes ten processing elements (labeled as PE1-PE10) running on the hosts $130_{1-4}$. A processing element is composed of one or more operators fused together into an independently running process with its own process ID (PID) and memory space. In cases where two (or more) processing elements are running independently, inter-nodal communication may occur using a network socket (e.g., a TCP/IP socket). However, when operators are fused together, the fused operators can use more rapid intra-nodal communication protocols, such as shared memory, for passing tuples among the joined operators in the fused processing elements.

As shown, the operator graph 132 begins at a source 135 (that flows into the processing element labeled PE1) and ends at sink $140_{1-2}$ (that flows from the processing elements labeled as PE6 and PE10). Host $130_1$ includes the processing elements PE1, PE2, and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on host $130_2$. Likewise, the data tuples emitted by PE4 flow to sink PE6 $140_1$. Similarly, data tuples flowing from PE3 to PE5 also reach sink PE6 140$_1$. Thus, in addition to being a sink for this example operator graph 132, PE6 could be configured to perform a join operation, combining tuples received from PE4 and PE5. This example operator graph 132 also shows data tuples flowing from PE3 to PE7 on host 130$_3$, which itself shows data tuples flowing to PE8 and looping back to PE7. Data tuples emitted from PE8 flow to PE9 on host 130$_4$, which in turn emits tuples to be processed by sink PE10 140$_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

FIG. 2 is a more detailed view of a host 130 of FIGS. 1A-1B, according to one embodiment of the invention. As shown, the host 130 includes, without limitation, at least one CPU 205, a communication adapter 215, an interconnect 220, a memory 225, and storage 230. The host 130 may also include an I/O devices interface 210 used to connect I/O devices 212 (e.g., keyboard, display and mouse devices) to the host 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, communication adapter 215, and memory 225. CPU 205 is representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data. The communication adapter 215 (e.g., a network adapter or query engine) facilitates communication with one or more communication devices 120 that use a particular communication protocol, such as TCP/IP, RDMA protocols, a shared file system protocol, and the like.

In this example, the memory 225 includes multiple processing elements 235. Each PE 235 includes a collection of fused operators 240. As noted above, each operator 240 may provide a small chunk of executable code configured to process data flowing into a processing element (e.g., PE 235) and to emit data to other operators 240 in that PE 235 or to other processing elements in the stream application. PEs 235 may be allocated to the same host 130 or located on other hosts 130 and communicate via the communication devices 120. In one embodiment, a PE 235 can only be allocated to one host 130.

A PE 235 may also include constraints 255 that govern, at least partially, how the scheduler 134 determines a "candidate host" for a PE 235—i.e., a host 130 that satisfies the constraints 255 necessary to allocate a PE to that particular host 130. For example, a constraint 255 associated with a PE 235 or operator 240 may comprise "isolation" which stipulates that the associated operator 240 cannot share a host 130 with any other PE 235, "co-location" which stipulates that multiple PEs 235 in a group must execute on the same host 130, "ex-location" which stipulates that multiple PEs 235 in a group cannot execute on the same host 130, "explicit host" which stipulates that a PE 235 must be located on a specific host 130 (e.g., host 1300, "non-relocatable" which stipulates that a PE 235 cannot be relocated after being allocated to a host 130, "override" which stipulates that which host 130 must be allocated to which PE 235 and overrides any previous constraints, "indexing the hostpool" which stipulates the host 130 that will execute the PE 235 based on an index value of the hostpool, and the like. Other constraints 255 may be associated with the host 130 instead of the PE 235 or operator 240 such as "overloaded host" which stipulates a maximum number of PEs 235 that may be allocated to the host 130, or "scheduling state" which stipulates whether the host 130 is in a state that supports hosting a new PE 235. However, constraints 255 are not limited to the elements discussed above but may be associated with other elements of the stream application which are considered by the scheduler 134 when allocating PEs 235 to hosts 130.

Moreover, the example constraints 255 listed above are not intended to be an exhaustive list of all possible constraints 255. Instead, one of ordinary skill in the art will recognize that the embodiments disclosed herein may be used with many different techniques of specifying which host 130 is to be allocated to a particular PE 235 or operator 240.

Figure 3:
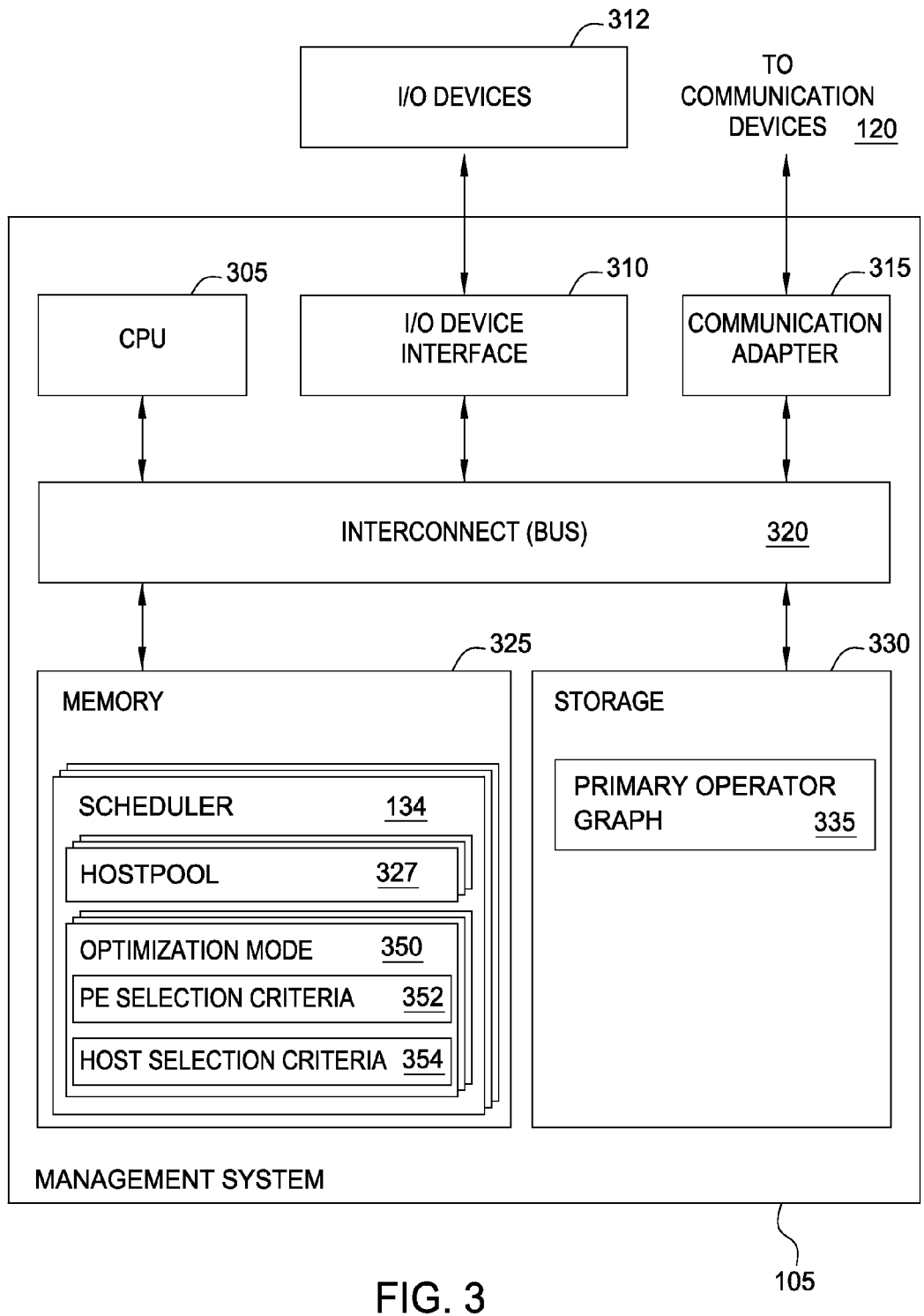
FIG. 3 is a more detailed view of the management system of FIG. 1, according to one embodiment of the invention.

FIG. 3 is a more detailed view of the management system 105 of FIG. 1, according to one embodiment of the invention. As shown, management system 105 includes, without limitation, at least one CPU 305, communication adapter 315, an interconnect 320, a memory 325, and storage 330. The client system 130 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, communication adapters 315, and memory 325. Like CPU 205, CPU 305 is included to be representative of a single CPU, multiple CPUs, a single CPU having multiple processing cores, and the like. Memory 325 is generally included to be representative of a random access memory. The communication adapter 315 is configured to transmit data via the communication devices 120 to the hosts 130 using any number of communication protocols. This may the same or different communication protocol used by the PEs 235 to transmit data. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices. The storage includes a primary operator graph 335. The primary operator graph 335, like the one illustrated in FIG. 1B, defines the arrangement of the processing elements, as well as the execution path use by processing element 235 to communicate with a downstream processing element 235.

The memory 325 may include a scheduler 134 that manages one or more hostpools 327 and optimization modes 350. A hostpool 327 may be associated with a particular PE 235, operator 240, or more generally, a job. For example, an application developer may assign a hostpool 327 for each job, thereby associating each PE 235 in that job to the hostpool 327. Alternatively, the developer or scheduler 134 may individually assign each PE 235 or operator 240 to a hostpool 327. In one embodiment, the PE 235 may be associated with one or more hostpools 327 but each operator 240 in the PE 235 may be assigned to only one hostpool 327. The hostpool 327 may also have a predetermined size that stipulates how many hosts 130 may be "pinned" or assigned to the hostpool. This prevents the scheduler 134 from pinning too many hosts 130 to a hostpool 327 to the detriment of other jobs that may be sharing the same computer infrastructure 100. Further, in one embodiment, a hostpool 327 may be indexed much like an array. For example, host $130_1$ and host $130_2$ are pinned to Hostpool A, Hostpool A[0] may reference host $130_1$ while Hostpool A[1] references host $130_2$. The hosts $130_{1-2}$ may be pinned to a particular index value based on what order the hosts $130_{1-2}$ were pinned to the hostpool 327 or by a developer or compiler specifying that a particular PE's host should be located at a particular index value—i.e., the "indexing the hostpool" constraint 255.

Figure 4A:
Figure 4A:
Figure 4A:

Other constraints 255 may be associated with the hostpools 327 such as "maximum size" which limits the number of hosts 130 that may be assigned to the hostpool 327, "tagged requirements" which are discussed in FIGS. 4A-B, "exclusive hostpool" which stipulates that the hosts 130 in the hostpool 327 may not be used by any other PEs 235 in any other jobs, and the like.

An optimization mode 350 may include PE selection criteria 352 and/or host selection criteria 354. Further, the scheduler 134 may have multiple optimization modes 350. In general, the optimization mode 350 uses the PE and host selection criteria 352, 354 to optimize the stream application according to a desired goal, such as performance, solvability, operation costs, maintenance costs, sharing hosts with other applications or some combination of these (or other) goals. For example, a stream application user or developer may want to optimize the stream such that PEs 235 are allocated to hosts 130 to balance between performance of the stream application and sharing the hosts 130 with other applications—i.e., leaving computing resources so that other applications may use them. With this particular optimization mode 350, the host selection criteria may include selecting the host 130 with the most available processing power (i.e., focus on performance) and selecting the host 130 with the greatest number of processes currently executing (i.e., leaving other compute nodes available for other applications).

As used herein, "criteria" are different than constraints 255. If a host 130 does not meet a constraint 255, the PE cannot be allocated to it. However, the scheduler 134 may use selection criteria 352, 354 to choose between multiple hosts that satisfy the constraints 255. For example, the scheduler 134 may use criteria such as selecting the host 130 with the most available processing power to pin to the hostpool 327 if there are multiple hosts 130 that satisfy the constraints 255—i.e., there are multiple candidate hosts.

Different optimization modes may be achieved by changing, adding, reordering, or removing the selection criteria 352, 254. For example, an optimization mode 350 focusing on performance may have a PE selection criterion 352 that selects the PE with the largest estimated resource requirement. However, a different optimization mode 350 may include other PE selection criteria 352, such as selecting the PE with the most stringent location constraints 255 (e.g., co-locate, ex-located, etc.). This optimization mode 350 would thus focus more on solvability—i.e., the likelihood the scheduler 134 will be able to allocate each PE 235 to a host 130. Accordingly, the focus or preference embodied by an optimization mode 350 is defined by the characteristics of the criteria 352, 354 associated with the mode 350. Different criteria 352, 354 and the ways the criteria may be combined to make different optimization modes 350 will be discussed below with reference to FIG. 8.

FIGS. 4A-4B illustrate tables detailing the assignment of hosts to hostpools, according to embodiments of the invention. Specifically, FIG. 4A illustrates tables that identify candidate hosts for a hostpool 327. Table 405 lists hosts 130 (Hosts A-F) that are available to a stream application. Each of the hosts 130 are assigned with a characteristic tag. The tag represents a characteristic of the host 130 such as whether the host 130 has high-memory, multiple processor cores, is compatible with a high-speed communication protocol, recently upgraded, a specific type of processor, a specific operating system, and the like. Moreover, the tag may abstract one or more characteristics by using a simple code word or number. For example, red may indicate a high-memory host 130 while green is a host 130 that has recently been upgraded and has a specific type of processor. Moreover, a host 130 may have multiple tags if it has more than one of the tagged characteristics. For example, Host C and D both have two tags. Additionally, a host 130 may not be assigned any tag or given a default tag if it does not have any of the tagged characteristics.

Table 410 lists three hostpools 327 (Hostpools 1-3) that have a predetermined size and tag. The size indicates the maximum number of hosts 130 that may be pinned to the hostpool 327. In one embodiment, the tag may be used to indentify hosts 130 that are eligible to be included into the hostpool 327. For example, a developer may stipulate that a PE 235 must be executed by a high-memory host 130—i.e., the PE 235 must be allocated to a host 130 with a certain characteristic. Accordingly, the developer or scheduler 134 may associate the PE 235 with a hostpool 327 that has the tag that corresponds to the high-memory characteristic. When determining candidate hosts for the PE 235, the scheduler 134 may match the tag of the hostpool 327 in Table 410 with the tag of the host 130 in Table 405.

Table 415 lists the possible hosts 130 that may be matched with each hostpool 327 by matching the tag constraint. Hosts A, B, or C may be pinned to Hostpool 1, Hosts C, E, or F may be pinned to Hostpool 2, and Host D may be pinned to Hostpool 3.

FIG. 4B depicts tables that illustrate the issues that arise when assigning PEs with constraints to hosts. Table 420 pins eligible hosts 130 to a hostpool 327. In this case, a host 130 is pinned based on at least two constraints 255 associated with the hostpool 327: whether it has a matching tag and whether the size of the hostpool 327 is met.

Because there are multiple hosts 130 that may satisfy the constraints 255, criteria may be used to select between the hosts. For the sake of simplicity, the criterion used in Table 420 to choose between the multiple hosts 130 was alphabetical ordering of the hosts' labels. In this manner, Hosts A and B are pinned to Hostpool 1, Hosts C, D, and E are pinned to Hostpool 2, and Host D is pinned to Hostpool 3. Note that a host 130 may be pinned in multiple hostpools 327 so long as it matches the hostpool's tag.

Table 425 list possible constraints 255 that may be associated with PEs 235. As shown, each PE 235 is individually assigned to a particular hostpool 327 as well as being associated with at least one constraint 255. However, in one embodiment, a PE 235 may not have any constraints 255 or have multiple constraints 255. Because PE 1 and PE 2 are associated with the same co-located group, they must be allocated to the same host 130. PEs 2-5 are associated with the same ex-located group and thus cannot share the same host 130. That is, PE 2-5 must be allocated to different hosts 130 relative to each other but may be allocated to share a host with a PE 235 not in Ex-locate Group 1.

Applying the constraints 255 of Table 425 to the hostpools and pinned hosts of Table 420 show that it is an invalid assignment. Specifically, PE 1 and 2 must be located on the same host 130 but are assigned to two different hostpools 327 that do not have any pinned hosts 130 in common. To fix this problem, Host B in Hostpool 1 may be replaced with Host C since Host C has the necessary tags to be eligible for both Hostpool 1 and 2. In this manner, both PE 1 and PE 2 may be allocated to the same host 130—i.e., Host C.

However, this does not solve all the constraints 255. PE 2-5 must be allocated to separate hosts 130. Specifically PE 2, 4, and 5 are in Hostpool 2 and must each use a separate host 130; however, because Host D is in Hostpool 2, one of PE 2, 4, or 5 must be allocated to Host D which is also allocated to PE 3. To solve this problem, Host D in Hostpool 2 may be replaced by Host F. Table 430 lists one solution that satisfies both constraints 255—i.e., the tag characteristics required by the hostpools 327 and the ex-locate or co-locate groups associated with the PEs 235.

Figure 5:
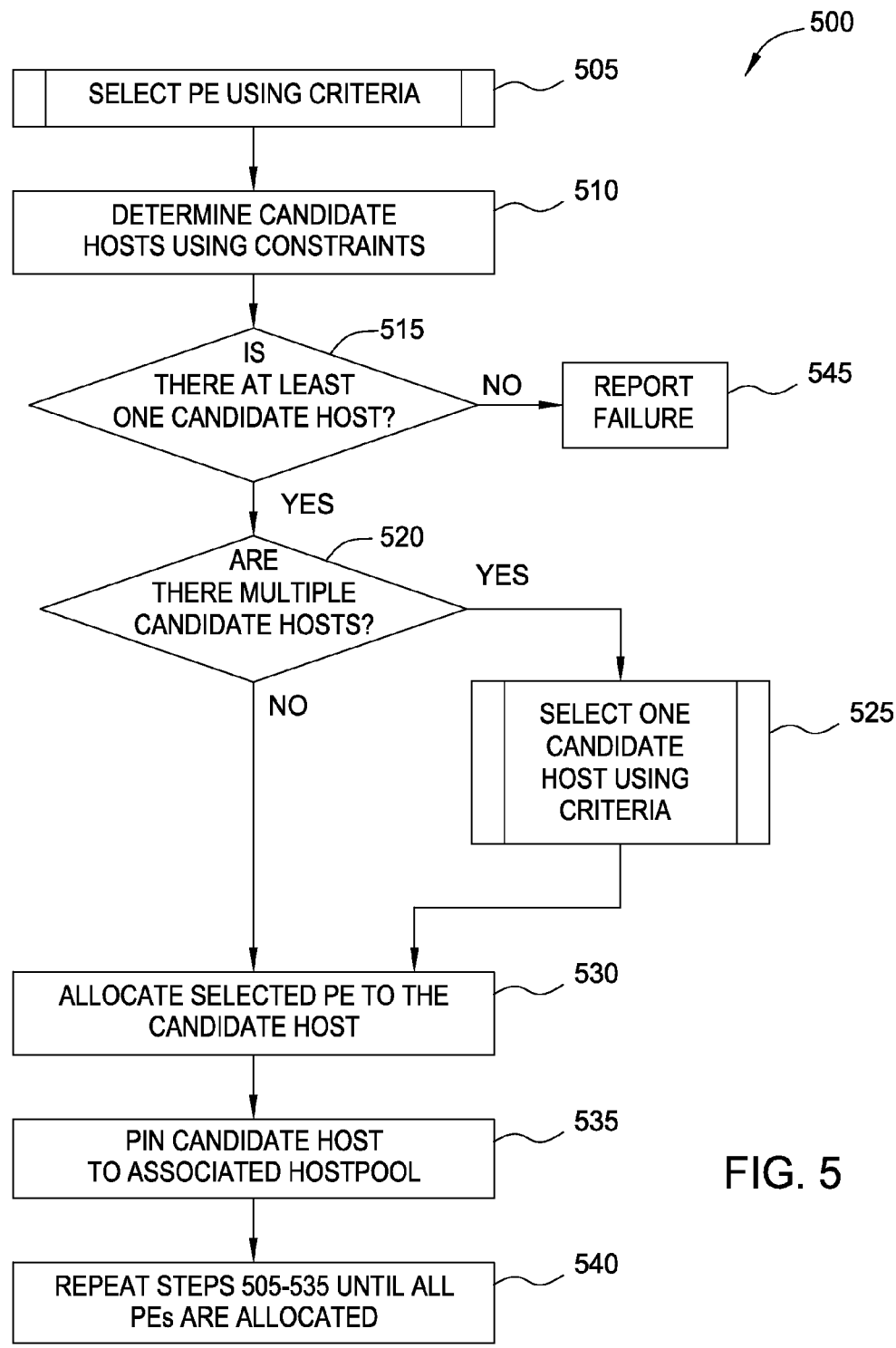
FIG. 5 is a flow diagram illustrating a technique of establishing a stream application, according to one embodiment of the invention.

FIG. 5 is a flow diagram illustrating the assignment of one or more hosts to a hostpool, according to embodiments of the invention. The technique 500 illustrated in FIG. 5 uses optimization modes 350 and selection criteria 352, 354 to customize and assist the allocation of PEs 235, hosts 130, and hostpools 327 as shown in FIGS. 4A-B. Specifically, in one embodiment, at blocks 505 and 525, the scheduler 134 may use PE and host selection criteria 352, 354 respectively to influence the allocation process.

At block 505, the scheduler 134 determines a candidate host set for a PE 235. In one embodiment, the scheduler 134 allocates the PEs 235 in the stream application iteratively—i.e., one at a time. However, the PEs 235 may not need to be allocated consecutively or in any particular order. Accordingly, the scheduler 134 may use an optimization mode 350 with its associated PE selection criteria 352 to select which unallocated PE 235 to allocate next. In general, the scheduler 134 or a user selects an optimization mode 350 that corresponds to the desired goal or focus—e.g., performance, cost, solvability, and the like. An optimization mode 350 that focuses on solvability, for example, has PE selection criteria 352 that increase the probability that all the PEs will be allocated—i.e., all the constraints 255 are satisfied. Stated differently, the selection criteria 352, 354 permits a user to add more requirements for allocating the PEs 235 than the constraints 255 that are included in the stream application itself. Although a stream application may need to satisfy all constraints 255 before it executes, the selection criteria 352, 354 determine which PEs 235 or hosts 130 to select when a plurality of these stream elements meet the constraints 255. For example, the same stream application that is optimized for performance may satisfy all the same constraints 255 as another instance of the application that is optimized for costs—i.e., the constraints 255 are common to both while the selection criteria 352, 354 is not.

At block 510, the scheduler 134 determines if at least one host 130 satisfies all the constraints 255 of the stream application. That is, whether there is at least one candidate host for the selected PE 235.

Although not necessary to perform the invention, in one embodiment, the scheduler 134 may use a constraint tree to identify the candidate hosts that satisfy the constraints 255 that are associated with the stream application elements that make up a stream application. The constraints 255 may be associated with only one or a combination of the different stream application elements. An example of a constraint tree will be discussed below with reference to FIG. 6.

At block 515, the scheduler 134 determines whether there is at least one candidate host. In one embodiment, the scheduler 134 may further distinguish between hosts 130 that satisfy all of the constraints 255 and hosts 130 that do not meet every constraint 255—i.e., if the selected PE 235 was allocated to the host, at least one constraint 255 would be violated. This process is described in an application by the same inventor that is co-pending with the current application entitled "CANDIDATE SET SOLVER WITH USER ADVICE" application Ser. No. 13/308,881 (which is herein incorporated by reference) and discloses tracking hosts 130 that do not meet every constraint 255 for overcoming faults or for assisting a user to create a customized stream application.

If after applying all the constraints 255 the scheduler 134 is unable to identify at least one candidate host, the scheduler 134 may report a failure at block 545. A failure may include informing the user of the stream application that the scheduler 134 was unable to allocate each of the PEs 235 of the stream application to a host 130 and still satisfy the current constraints 255. The stream application may immediately inform the user of a failure when a PE 235 cannot be allocated, or alternatively, the scheduler 134 may continue to allocate the rest of the PEs 235 before indicating that the PE assignment process failed. In one embodiment, the scheduler 134 may use I/O device interface 310 to transmit a failure message to a display device.

If the scheduler 134 is able to identify at least one candidate host, the technique 500 continues to block 520 to determine if there are multiple candidate hosts. As discussed earlier, the scheduler 134 may use the host selection criteria 354 associated with the selected optimization mode 350 to select a host 130 from the candidate host set at block 525. If the current optimization mode 350 focuses on the goal of performance, a host selection criterion 354 may include selecting the host 130 with the most available processing power remaining. If the optimization mode 350 focuses on costs, a host selection criterion 354 may be selecting the host that uses the least amount of energy per compute cycle. Like the PE selection criteria 352 discussed in block 505, the host selection criteria 354 allows a user or scheduler 134 to further customize the stream application in addition to the constraints 255.

However, if there is only one candidate host, the scheduler 134 may automatically allocate the selected PE 235 to that candidate host at block 530. Otherwise, the scheduler 134 may allocate the selected PE 235 to the host 130 chosen from the candidate host set using the host selection criteria 354.

At block 535, the scheduler 134 pins the candidate host to the hostpool 327 associated with the PE 235 that is allocated to the candidate host. In one embodiment, before pinning the candidate host to the hostpool 327 associated with the PE 235, the scheduler 134 may first determine if the candidate host is already pinned to the hostpool 327. If not, the scheduler 134 may pin (or assign) the candidate host to the hostpool 327. Part of this process may require assigning an index value to the candidate host in the hostpool 327 though this is not required. Assigning an index values and associating hosts 130 with hostpools 327 is discussed in further detail in an application by the same inventor that is co-pending with the current application entitled "AGILE HOSTPOOL ALLOCATOR" application Ser. No. 13/308,841 which is herein incorporated by reference. After pinning the suitable host or determining that the suitable host is already included in the hostpool 327, at block 525 the technique 500 may be repeated until each of the PEs 235 in a stream application is allocated or the technique 500 detects a failure.

Figure 6:
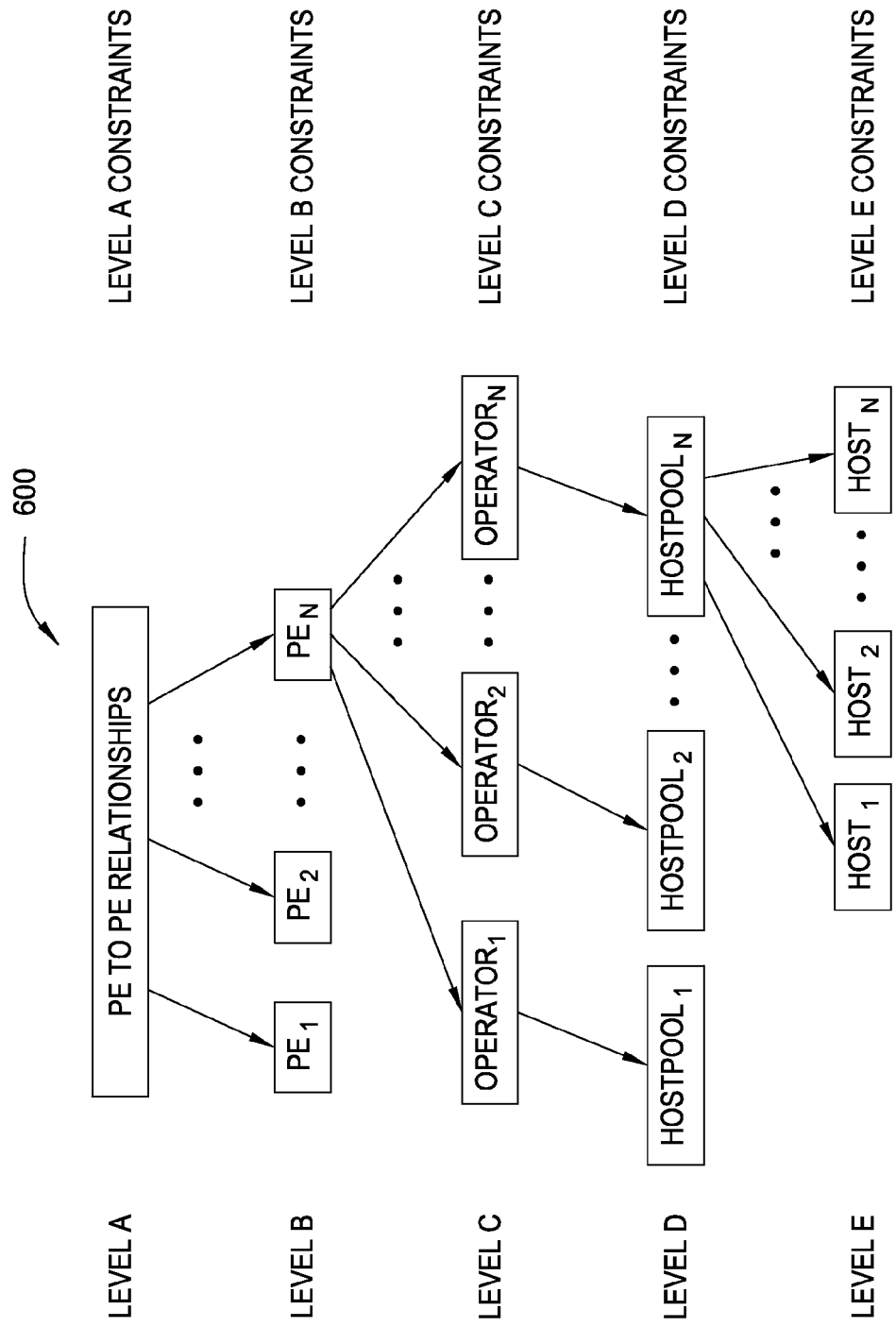
FIG. 6 illustrates a constraint tree for applying constraints, according to one embodiment of the invention.

FIG. 6 illustrates a constraint tree for applying constraints, according to one embodiment of the invention. Notably, a constraint tree 600 is only one technique of determining if a host 130 satisfies all the constraints 255. The constraint tree 600 divides up the different structures in a stream application into multiple levels to form a hierarchical relationship. The top level—Level A—represents the relationship between PEs. Level B includes the constraints that may be assigned to an individual PEs 235. As mentioned previously, a PE 235 may have one or more fused operators 240 which are represented by Level C of the tree 600.

In one embodiment, each operator 240 associated with a PE 235 is assigned to only one hostpool 327 while a PE 235 may be associated with one or more hostpools 327. Level D shows that the operators 240 associated with $PE_N$ are each associated with only one hostpool 327. However, the operators 240 may be associated with the same hostpool 327. Finally, each hostpool 327 may include one or more hosts 130—i.e., Level E. For the sake of clarity, many of the hierarchical relationships of the different levels, such as the operators associated with $PE_1$ and $PE_2$, are omitted from the figure.

In one embodiment, the scheduler 134 may use the constraint tree 600 to determine a candidate host set—i.e., hosts 130 that meet Level A-E constraints. The constraint tree 600 is a graphical representation of the different types of constraints that may be used to allocate the selected PE 235 to a host 130. That is, each constraint tree 600 may look different for each PE 235. Each level represents different types of constraints that may be checked by the scheduler 134. For a currently selected PE 235, the scheduler 134 may apply Level E constraints—i.e., constraints 255 associated with hosts 130. Level E constraints may include overloading or scheduling constraints as discussed previously. For example, the scheduler 134 may determine whether each host 130 in Level E is overloaded or if the host 130 is being used exclusively by a different job from the job that includes the currently selected PE 235. After determining which hosts 130 meet Level E constraints, the scheduler 134 may return to Level D to apply Level D constraints—i.e., constraints associated with hostpools 327—such as whether the hosts 130 selected from Level E have the same tag as the Level D hostpool 327 or if the size requirements of the hostpool 327 have been met. After applying Level D constraints, the scheduler 134 returns the hosts 130 that satisfy Level D and E constraints to Level C.

For each of the operators 240 in the selected PE 235, the scheduler 134 may apply Level C constraints associated with the operators 240 such as whether the operators 240 must run on a specific host 130 or whether one of the operators 240 should be the only operator 240 running on the host 130. The scheduler 134 checks the Level C constraints for each of the operators 240 against the candidate hosts returned from Level D. The hosts 130 that satisfy all the constraints 255 for at least one of the operators 240 are returned to Level B where the Level B constraints are applied. For example, the scheduler 134 may perform an Intersect function to determine if any of the hosts 130 that satisfy all of the constraints of at least one of the operators 240 of Level C also satisfies all the constraints 255 of all of the operators 240 in the selected PE 235. Additionally or alternatively, the Level B constraints may include determining whether the PE 235 is non-relocatable or if there is a constraint 255 that overrides any of the Level C-E constraints.

After determining which host or hosts 130 satisfy the constraints for Levels B-E, the scheduler 134 determines whether these hosts 130 also satisfy the constraints of Level A such as ex-locate or co-locate. That is, if $PE_1$ (e.g., the currently selected PE) and $PE_2$ must be co-located, then at Level A the scheduler 134 may perform an Intersect function to determine whether the two PEs 235 have at least one host 130 in common that meets all the Level B-D constraints for the respective PEs 235. If so, that host or hosts 130 become the candidate hosts for $PE_1$—i.e., block 520 of FIG. 5. In this manner, the scheduler 134 may use the constraint tree 600 to ensure that all constraints 255 are satisfied, thereby culling the candidate host set to include only the hosts 130 that meet Level A-E constraints. The scheduler 134 may then use the host selection criteria 354 to determine on which candidate host to place the selected PE 235.

Figure 7:
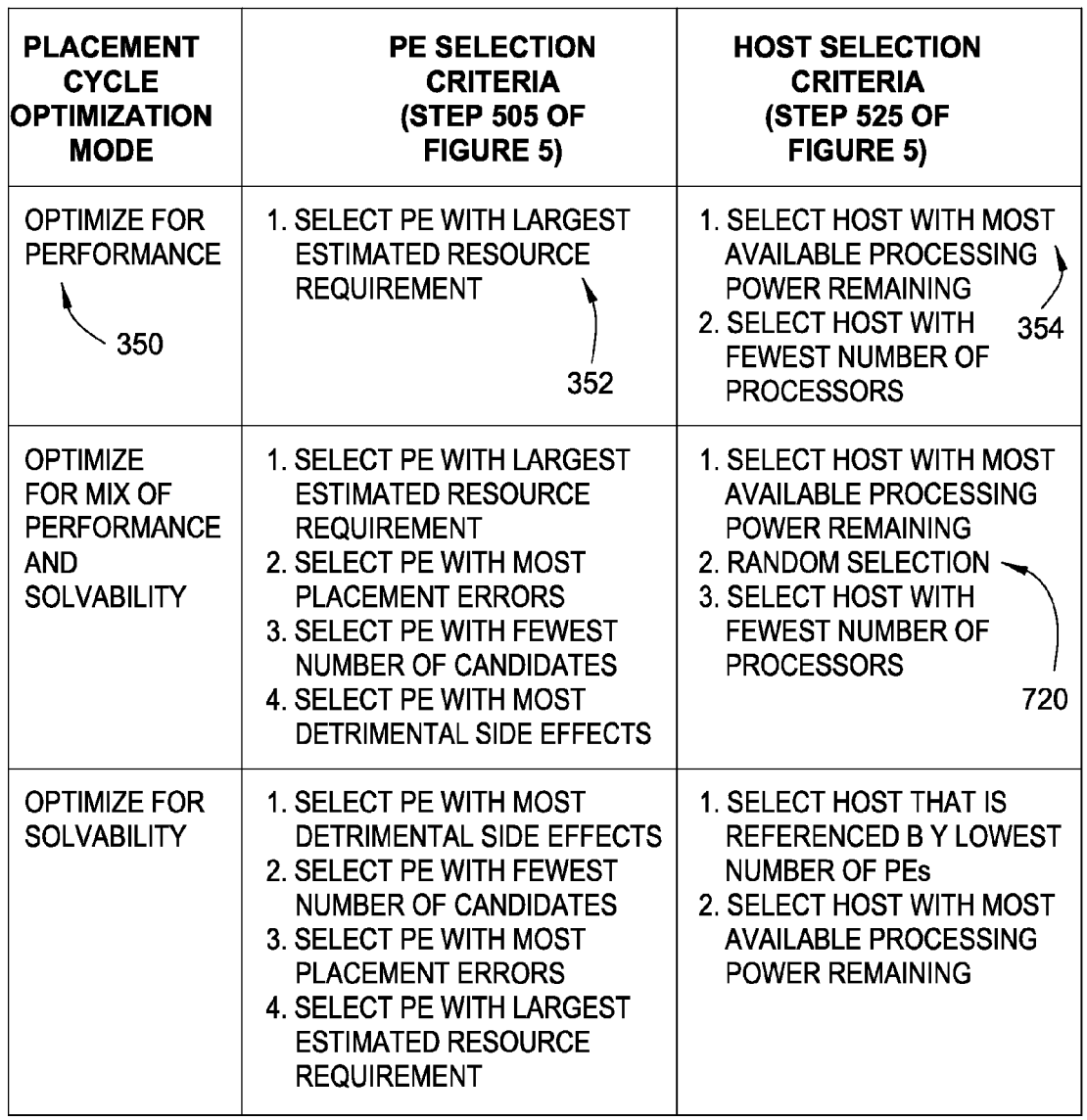
FIG. 7 is a table illustrating selection criteria associated with a plurality of optimization modes, according to one embodiment of the invention.

FIG. 7 is a table 700 illustrating selection criteria associated with a plurality of optimization modes, according to one embodiment of the invention. Specifically, FIG. 7 illustrates examples of the PE and host selection criteria 352, 354 that may be applied in block 505 and 525 of FIG. 5. For example, the information contained in table 700 may be stored in a data structure in the memory 325.

The first column includes different optimization modes 350 that may be selected by the scheduler 134 or a user of the stream application. As shown, each row in the first column describes an optimization mode 350 that optimize the allocation of the PEs 235 to achieve a different goal or combination of goals. The optimization mode 350 for the first row optimizes based solely on performance, the second row optimizes based on a mix of performance and solvability, and the third row optimizes based solely on solvability. In one embodiment, the rows in the first column may represent a sliding scale between two optimization goals. As shown, table 700 includes a sliding scale between considering only performance and considering only solvability. The optimization mode 350 in the second row represents a combination of these goals; however, the table 700 may include a plurality of combinations of the two goals to increase granularity.

Although table 700 includes a sliding scale between two performance goals, the optimization modes 350 may include a sliding scale between three or more goals. Alternatively, the table 700 may include a list of goals without a sliding scale between the goals—e.g., an optimization mode 350 for optimizing performance and an optimization mode 350 for optimizing costs. Further, the table 700 may include optimization modes 250 of different degree or levels of the same optimization goal. For example, one optimization mode 350 for optimizing performance may include PE selection criteria 352 that more aggressively optimize for performance than a second optimization mode 350 for optimizing performance.

When the scheduler 134 determines the current optimization mode 350, it then iterates through the selection criteria 352, 354 to select either a single PE 235 from the unallocated PEs 235 (i.e., block 505 of FIG. 5) or a host 130 from the candidate host set (i.e., block 525 of FIG. 5).

Figure 8A:
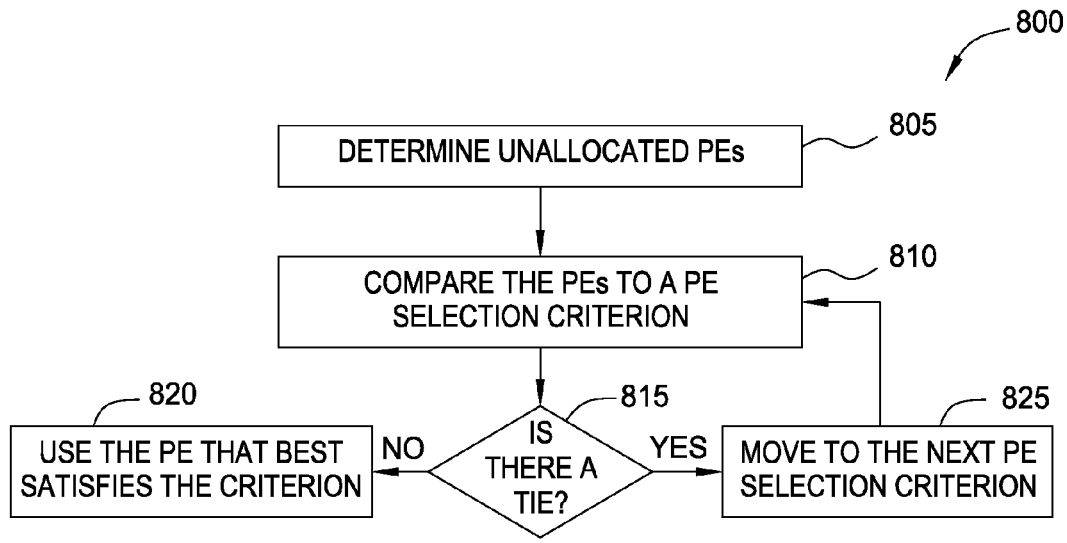
FIGS. 8A-8B are flow diagrams illustrating a technique of establishing a stream application using selection criteria, according to embodiments of the invention.

FIG. 8A illustrates a technique 800 of selecting an unallocated PE using PE selection criteria. Specifically, FIG. 8A is one embodiment of block 505 of FIG. 5. At block 805, the scheduler 134 determines the PEs 235 in the stream application that have not yet been allocated. At block 510, the scheduler 134 compares the unallocated PEs 235 to the first PE selection criterion 352. For example, assuming the scheduler 134 is using the optimization mode 350 of the second row of table 700, the scheduler 134 will identify the unallocated PE 235 that best satisfies the first criterion 352—i.e., the PE 235 with the largest estimated resource requirement. At block 815, the scheduler 134 determines if at least two of the PEs 235 tie—i.e., more than one PE 235 have in common the largest estimated resource requirement when compared to the other unallocated PEs 235. If there is not a tie, at block 820, the scheduler 134 selects the PE 235 that best satisfies the criterion 352 for allocation.

However, if there is a tie, then at block 825 the scheduler compares the PEs 235 that tied to the second criterion—i.e., the scheduler 134 selects the PE 235 with the most placement errors. This process continues until there is no longer a tie—i.e., the "best" PE 235 is identified—or there are no more PE selection criteria 352 to evaluate. In the latter case, the scheduler 134 may choose randomly the PE 235 to allocate or select a PE 235 that is connected in the operator graph 132 to a PE 235 that has already been allocated. This invention is not limited to any particular technique of breaking a tie when all selection criteria have been evaluated.

Figure 8B:
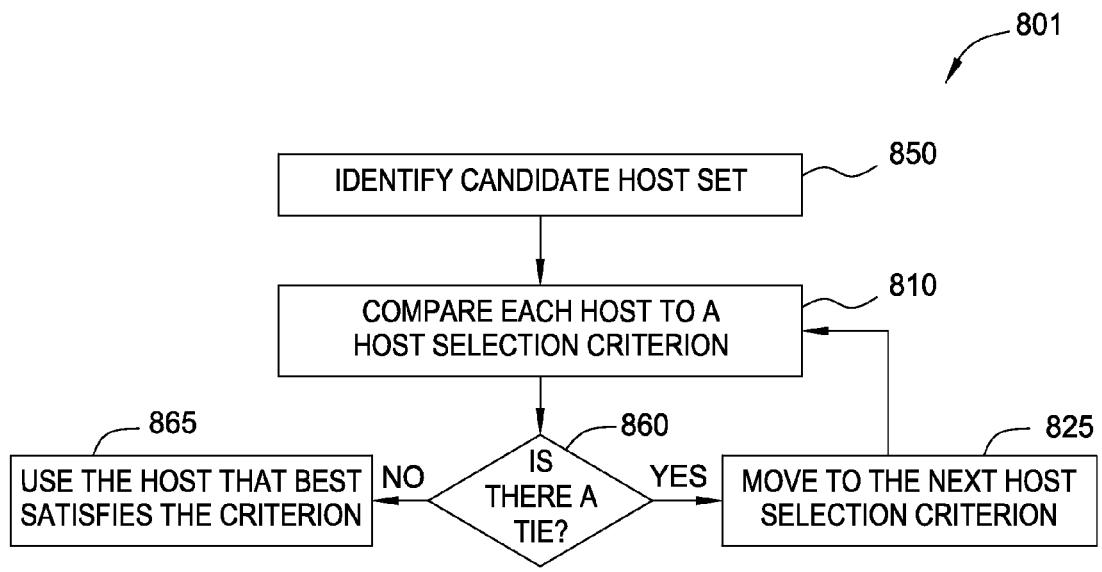

FIG. 8B illustrates a technique 801 of selecting a host 130 from a candidate host set using host selection criteria 354. Specifically, FIG. 8B is one embodiment of block 525 of FIG. 5. At block 850, the scheduler 134 identifies the candidate host set—i.e., a plurality of hosts 130 that satisfy the constraints 255 in the stream application for allocating a selected PE 235. At block 855, each of the hosts 130 in the candidate host set are compared with the first host selection criterion 354. Assuming the scheduler 134 is using the optimization mode 350 of the second row of table 700, the host or hosts 130 with the most available processing power remaining are identified. If one host 130 from the candidate host set has the most available processing power when compared to all the other hosts 130 in the candidate host set, then at block 865 the scheduler 134 may allocate the selected PE 235 that that host 130.

However, if the scheduler 134 determines at block 860 that more than one host 130 have in common the most available processing power, then at block 870 the scheduler 134 iterates to the next host selection criterion 354. In this example, the second criterion 354 instructs the scheduler 134 to make a random selection. In one embodiment, this random selection criterion 720 instructs the scheduler 134 to either select one of the hosts 130 that tied in the previous step or proceed to the next host selection criterion 354. If the random selection criterion 720 selects a host 130, then that host would be used to place the selected PE. This process may continue until a single host 130 is selected or until the host select criteria 354 have been exhausted.

Note that the random selection criteria 720 may also be used as PE selection criteria 352.

Returning to the table 700 of FIG. 7, the focus or goal of an optimization mode 350, as well as the different levels or degrees of that goal, may be determined by the (i) type, (ii) ordering, and (iii) number of selection criteria 352, 354 associated with that optimization mode 350. That is, the optimization mode 350 in the first row optimizes performance because it is associated with PE and host selection criteria 352, 354 that optimize performance. By changing the criteria 354, 352, the goal of the optimization mode 350 may also be changed. Thus, the optimization mode 350 of the second row is a combination of performance and solvability because it includes a combination of PE selection criteria 352 that select PEs 235 based on performance and solvability.

Types of selection criteria 352, 354 include criteria that distinguish between PEs 235 and hosts 130 by performance, cost, solvability, and the like. Accordingly, a user or developer of the stream application may choose the different criteria from the different types to customize an optimization mode 350 that meets her desired goals.

Ordering of the selection criteria 352, 354 also may change the goal of an optimization mode 350. For example, if the host selection criteria 354 of the first row in table 700 are applied to Host A that has 25% available processing power and four processors and to Host B that has 15% available processing power and three processors, Host A is selected. However, if the user switches the criteria, Host B is selected.

The total number of selection criteria 352, 354 may also affect the goal of a optimization mode 350, even if the criteria 352, 354 are the same type. For example, if a user wants to aggressively customize the stream application to consider performance, the user may create an optimization mode 350 with multiple section criteria 352, 354 that include selecting the host with the most available processing power as well as focusing on particular performance issues. This may customize the stream application more than simply selecting a host with the most available processing power.

Figure 9:
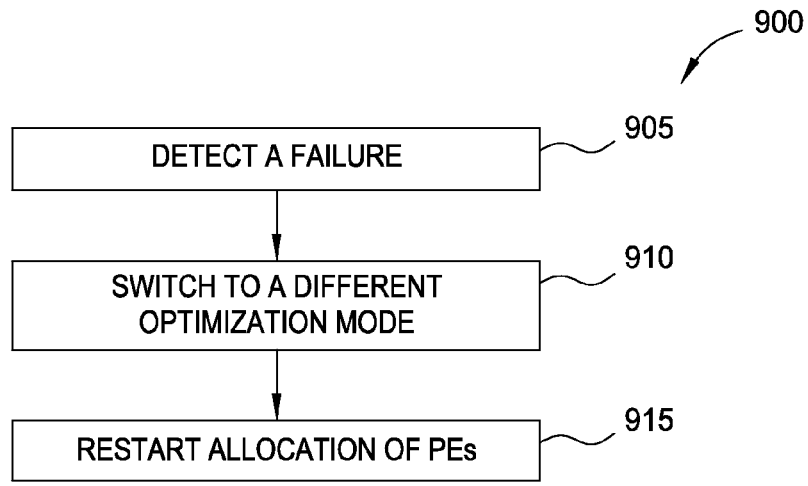
FIG. 9 illustrates a technique for changing optimization modes, according to one embodiment of the invention.

FIG. 9 illustrates a technique 900 for changing optimization modes, according to one embodiment of the invention, according to one embodiment of the invention. The scheduler 134 may change the optimization mode 350 if the PEs 235 are unable to be allocated to a respective host 130. For example, at block 905, the scheduler 134 may detect a failure, for example, a failure discussed in block 545 of FIG. 5. In response, the scheduler 134 may at block 910 change to a different optimization mode 350. In table 700 of FIG. 7, the optimization modes 350 are arranged from optimizing based on performance to optimizing based on solvability. The scheduler 134 may start out using the optimization mode 350 that focuses solely of performance, but after detecting a failure, may change to the optimization mode 350 that includes a combination of performance and solvability selection criteria 352, 354. At block 915, the scheduler 134 may restart the allocation of the PEs in the stream application.

In one embodiment, if the scheduler 134 still fails to allocate all the PEs 235 using that optimization mode 350, it may again change to an optimization mode 350 that has selection criteria 352, 354 selected to improve solvability of the stream application—i.e., the scheduler 134 iteratively progresses through the sliding scale of optimization modes 350. Advantageously, using a sliding scale permits the scheduler 134 to determine the optimization mode that allocates all the PEs yet best balances between two goals—e.g., minimizing costs versus sharing computer resources with other applications. Moreover, the greater the granularity of the sliding scale—i.e., the greater the number of optimization modes 350 that combine criteria from the desired goals—the better the ability of the scheduler 134 to balance between the desired goals.

Alternatively, the scheduler 134 may receive from the user a set of preferences such as requiring the scheduler 134 to first attempt to allocate the PEs 235 while optimizing based on performance, but if that fails, then attempting to optimizing based on costs, but if that fails, then optimizing based on solvability. Thus, a scheduler 134 may change the optimization mode 350 without using a sliding scale between two goals but instead use a user preference related to each type of goal. One of ordinary skill in the art will recognize the many different techniques for determining a different optimization mode.

In one embodiment, the scheduler 134 may not change to a different predetermined optimization mode 350 but instead add or remove one or more selection criteria 352, 354 into the current optimization mode 350 or reorder the current selection criteria 352, 354. This technique alters the desired goal of the optimization mode 350 but may allow the scheduler 134 to allocate all the PEs. Upon detecting a failure, instead changing modes 350, the scheduler 134 may add a PE selection criterion 352 that alters the current optimization mode 350—e.g., allocating first the PEs 235 with the most detrimental side effects.

In another embodiment, the scheduler 134 may determine where to place the additional selection criterion 352, 354 based on how many of the total PEs 235 were placed before the allocation process failed. That is, because in one embodiment the scheduler 134 evaluates the selection criteria 352, 354 in a defined order, where the criterion is placed may affect its ability to change the solvability of the stream application. For example, if 80% of the PEs 235 were placed, the scheduler 134 may add the criteria to alter the optimization mode 350 at a lower priority in the selection criteria 352, 354—e.g., the third or fourth criteria in either the PE or host selection criteria 352, 354. However, if only 25% of the PEs 235 were placed, the scheduler 134 may add the extra criterion as the first or second criteria in either the PE or host selection criteria 352, 354.

Similarly, in one embodiment, the scheduler 134 may add into the criteria for the current optimization mode 350 one or more random selection criteria 720. For example, if the scheduler 134 placed 98% of the PEs in a stream application before failing, adding a random selection criteria 720 may be enough to change the PE allocation such that after the process is restarted, all the PEs 235 are successfully placed. Advantageously, adding a random selection criteria 720 to either the PE or host selection criteria 352, 354 may lead to an executable stream application but have only a minimal affect on the desired goal of the optimization mode 350 relative to adding a more substantive criterion as discussed previously.

Figure 10:
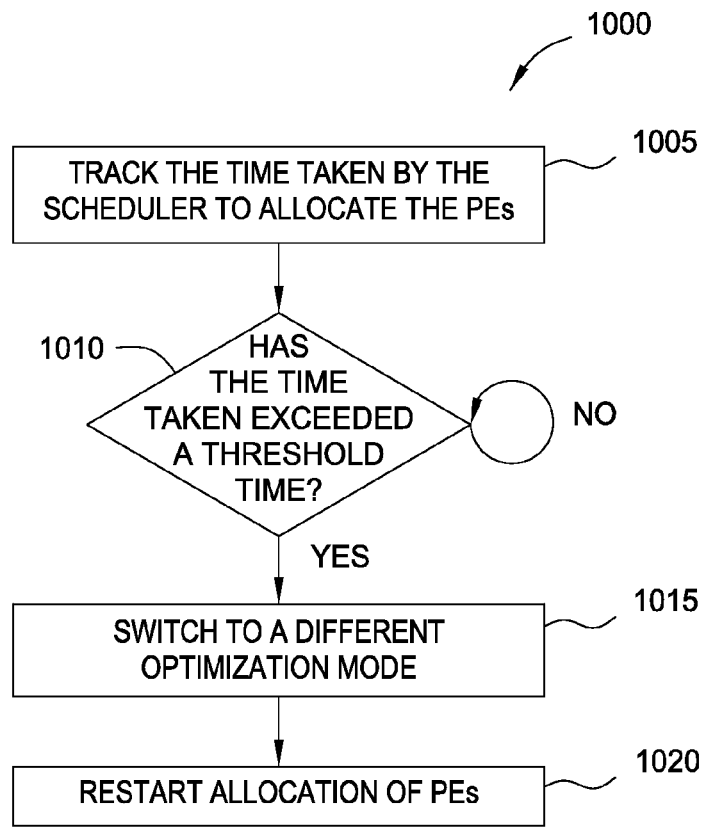
FIG. 10 illustrates a technique for changing optimization modes, according to one embodiment of the invention

FIG. 10 illustrates a technique 1000 for changing optimization modes, according to one embodiment of the invention. The scheduler 134 may change the optimization mode 350 based on the time taken to allocate the PEs 235. At block 1005, the scheduler 134 may include a timer that tracks the amount of time that has elapsed since when the scheduler 134 first began to allocate the PEs 235. If at block 1010 the scheduler 134 determines that the elapsed time has exceeded a predetermined threshold—e.g., more than three minutes— the scheduler 134 may stop the allocation and change to a different optimization mode 350 at block 1015. The optimization mode 350 may be changed or altered according to any of the embodiments discussed along with FIG. 9. At block 1020, the scheduler 134 may restart the allocation of the PEs using the different optimization mode 350.

In one embodiment, the scheduler 134 may adjust the threshold time based on the complexity of the stream application, e.g., the number of PEs, number of constraints 255, number of available hosts 130, PE/host ratio, and the like. For example, the scheduler 134 may include look-up tables or weighted algorithms that set the proper threshold time based on their respective values.

In one embodiment, the scheduler 134 may perform pre-analysis on the stream application to determine the optimization mode before starting to allocate the PEs 235. Specifically, the scheduler 134 may consider number and types of constraints 255 associated with the stream application along with the current cluster configuration of the hosts 130. The types of constraints 255 are defined by the constraints that are associated with a stream application element such as a PE 235, operator 240, host 130, hostpool 327, or job. For example, a stream application with a high percentage of job constraints 255 (i.e., ex-locate or co-locate) may be harder to allocate than a stream application with the same number of total constraints 255 but with a lower percentage of job constraints 255. A scheduler 134 can recognize this characteristic of the stream application and choose an optimization mode that focuses on solvability. That is, instead of starting with an optimization mode 350 focusing on performance, the scheduler 134 may select the optimization mode 350 that mixes performance criteria with solvability criteria—i.e., chooses an optimization mode 350 from a sliding scale of modes 350. Alternatively, if there are few constraints 255 or a low percentage of a certain type of constraint 255 that is difficult to satisfy, the scheduler 134 may choose to start with an optimization mode 350 that focuses on performance or may even add more selection criteria 352, 354 to a optimization mode 350 to more aggressively focus on a desired goal.

In a similar embodiment, the scheduler 134 may build a customized optimization mode 350 based on the same criteria discussed above in regards to performing pre-analysis of a stream application. For example, the scheduler may consider number and types of constraints 255 associated with the stream application along with the current cluster configuration of the hosts 130. In contrast to selecting a pre-defined optimization mode 350, the scheduler 134 may build an optimization mode 350 based upon pre-defined selection criteria 352, 354. The scheduler 134 may have access to, for example, the selection criteria shown in table 700 which it can then use to build a customized mode 350. If the job has demanding constraints 255 and only a handful of available hosts 130, the scheduler 134 may select criteria that are associated with solvability. That is, each selection criteria may be associated with a particular type of optimization (e.g., solvability, performance, etc.) and may have a ranking within each type. That is, certain selection criteria within an optimization type may have a greater ability to perform that optimization than others. For example, the criteria of "selecting a host with the most available processing power remaining" may be better at optimizing performance than the criteria of "selecting the host with the fewest number of processors." The scheduler 134 may use an algorithm that takes the characteristics of the streaming environment and determines the optimization type and strength of selection criteria needed. For example, the scheduler 134 may select the third ranked criterion from the performance optimization and the second ranked criterion in the solvability optimization to build the customized optimization mode. Moreover, the scheduler may insert random criteria into the customized mode. Accordingly, by considering the number and types of constraints and the cluster configuration, the scheduler 134 may select criteria from the different types of optimizations to create a customized optimization mode 350.

The cluster configuration of the hosts 130 may include the number of hosts 130 that are available. The scheduler 134 may balance the cluster configuration with the number of PEs 235 to be placed—i.e., a PE/Host ratio. If the ratio is high, the scheduler 134 may use an optimization mode 350 that focuses on solvability, but if the ratio is low, the scheduler 134 may use an optimization mode 350 that focuses on some other goal such a cost, performance, sharing resource, etc.

Conclusion

A stream application may allocate processing elements to one or more compute nodes (or hosts) to achieve a desired optimization goal. Each optimization mode may define PE selection criteria and/or host selection criteria. When allocating a PE to a host, a scheduler may place each PE individually. Accordingly, the scheduler may use the PE selection criteria for selecting which PE in the stream application to allocate next. The scheduler may then determine, based on one or more constraints, which host the PE can be placed on. If the scheduler determines that multiple hosts are suitable candidates for the PE, it may use the host selection criteria to pick one of the candidate hosts that further optimize the stream application. Examples of different optimization goals that may be achieved using PE and host selection criteria include optimizing performance, decreasing maintenance and operating costs, increasing solvability, sharing limited computer resources with other applications, and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for establishing a stream application, comprising:
   selecting a current optimization mode from a plurality of optimization modes based on at least one of a number of constraints, a type of each constraint, and a number of a plurality of compute nodes;
   selecting, by operation of one or more computer processors, a processing element from a plurality of processing elements in the stream application based on at least one processing element selection criteria;
   determining, based on one or more constraints, a plurality of candidate compute nodes to which the processing element can be allocated from among a plurality of compute nodes;
   selecting, based on at least one compute node selection criteria, a compute node from the candidate compute nodes,
   wherein at least one of the processing element selection criteria and the compute node selection criteria is determined by a current optimization mode for the stream application; and
   allocating the processing element to the selected compute node.

2. The method of claim 1, wherein the plurality of processing elements establish an operator graph of the plurality of processing elements, the operator graph defining at least one execution path and wherein at least one of the processing elements of the operator graph is configured to receive data from at least one upstream processing element and transmit data to at least one downstream processing element.

3. The method of claim 1, further comprising:
   detecting a failure to allocate at least one of the plurality of processing elements to at least one of the plurality of compute nodes;
   upon detecting the failure, changing the current optimization mode to a different optimization mode selected from a plurality of optimization modes; and
   restarting an allocation of the plurality of processing elements in the stream application.

4. The method of claim 1, further comprising:
   detecting a failure to allocate at least one of the plurality of processing elements to at least one of the plurality of compute nodes;
   upon detecting the failure, adding a random criteria into at least one of the processing element selection criteria and the computer node selection criteria, the random criteria randomly determines (i) the compute node from the candidate compute nodes or (ii) to evaluate a different criteria; and
   restarting an allocation of the plurality of processing elements in the stream application.

5. The computer-implemented method of claim 1, wherein the current optimization mode optimizes at least one of a solvability of the stream application, a performance of the stream application, a cost of executing the stream application, and a cluster configuration of the stream application.

6. A computer-implemented method for establishing a stream application, comprising:
   selecting, by operation of one or more computer processors, a processing element from a plurality of processing elements in the stream application based on at least one processing element selection criteria;
   determining, based on one or more constraints, a plurality of candidate compute nodes to which the processing element can be allocated from among a plurality of compute nodes;
   selecting, based on at least one compute node selection criteria, a compute node from the candidate compute nodes,
   wherein at least one of the processing element selection criteria and the compute node selection criteria is determined by a current optimization mode for the stream application;
   allocating the processing element to the selected compute node;
   allocating each of the plurality of processing elements in the stream application;
   if the time spent allocating each of the plurality of processing elements exceeds a threshold time, changing the current optimization mode to a different optimization mode selected from the plurality of optimization modes; and
   restarting an allocation of the plurality of processing elements in the stream application.

7. The method of claim 6, wherein the plurality of processing elements establish an operator graph of the plurality of processing elements, the operator graph defining at least one execution path and wherein at least one of the processing elements of the operator graph is configured to receive data from at least one upstream processing element and transmit data to at least one downstream processing element.

8. The method of claim 6, further comprising:
   detecting a failure to allocate at least one of the plurality of processing elements to at least one of the plurality of compute nodes;
   upon detecting the failure, changing the current optimization mode to a different optimization mode selected from a plurality of optimization modes; and
   restarting an allocation of the plurality of processing elements in the stream application.

9. The method of claim 6, further comprising:
   detecting a failure to allocate at least one of the plurality of processing elements to at least one of the plurality of compute nodes;
   upon detecting the failure, adding a random criteria into at least one of the processing element selection criteria and the computer node selection criteria, the random criteria randomly determines (i) the compute node from the candidate compute nodes or (ii) to evaluate a different criteria; and
   restarting an allocation of the plurality of processing elements in the stream application.

10. A computer-implemented method for establishing a stream application, comprising:
- selecting, by operation of one or more computer processors, a processing element from a plurality of processing elements in the stream application based on at least one processing element selection criteria;
- determining, based on one or more constraints, a plurality of candidate compute nodes to which the processing element can be allocated from among a plurality of compute nodes;
- selecting, based on at least one compute node selection criteria, a compute node from the candidate compute nodes,
- wherein at least one of the processing element selection criteria and the compute node selection criteria is determined by a current optimization mode for the stream application;
- allocating the processing element to the selected compute node; and
- before selecting the processing element from the plurality of processing elements, generating the current optimization mode based on (i) at least one of a number of the constraints, a type of each constraint, and a number of the plurality of compute nodes and (ii) a set of at least one of pre-defined element selection criteria and compute node selection criteria.

11. The method of claim 10, wherein the plurality of processing elements establish an operator graph of the plurality of processing elements, the operator graph defining at least one execution path and wherein at least one of the processing elements of the operator graph is configured to receive data from at least one upstream processing element and transmit data to at least one downstream processing element.

12. The method of claim 10, further comprising:
- detecting a failure to allocate at least one of the plurality of processing elements to at least one of the plurality of compute nodes;
- upon detecting the failure, changing the current optimization mode to a different optimization mode selected from a plurality of optimization modes; and
- restarting an allocation of the plurality of processing elements in the stream application.

13. The method of claim 10, further comprising:
- detecting a failure to allocate at least one of the plurality of processing elements to at least one of the plurality of compute nodes;
- upon detecting the failure, adding a random criteria into at least one of the processing element selection criteria and the computer node selection criteria, the random criteria randomly determines (i) the compute node from the candidate compute nodes or (ii) to evaluate a different criteria; and
- restarting an allocation of the plurality of processing elements in the stream application.

* * * * *